United States Patent [19]
Ohmori et al.

[11] Patent Number: 5,163,037
[45] Date of Patent: Nov. 10, 1992

[54] DISC CARTRIDGE AND RECORDING/REPRODUCING APPARATUS DISCRIMINATING MEANS

[75] Inventors: Kiyoshi Ohmori; Minoru Ishida, both of Kanagawa; Kenji Takahashi, Miyagi, all of Japan

[73] Assignee: Sony Corporation, Tokyo, Japan

[21] Appl. No.: 715,758

[22] Filed: Jun. 14, 1991

[30] Foreign Application Priority Data

Jun. 21, 1990 [JP] Japan .................. 2-161444

[51] Int. Cl.⁵ .................. G11B 33/02; G11B 23/03; G11B 5/84; G11B 7/26
[52] U.S. Cl. .................. 369/77.2; 369/291; 360/133; 360/99.06
[58] Field of Search .................. 369/291, 75.2, 77.1, 369/77.2; 360/133, 99.02, 99.03, 99.06, 99.07; 206/444

[56] References Cited

U.S. PATENT DOCUMENTS

| | | | |
|---|---|---|---|
| 4,680,662 | 7/1987 | Fukushima et al. | 369/291 X |
| 4,731,776 | 3/1988 | Ishii et al. | 369/291 X |
| 4,814,924 | 3/1989 | Ozeki | 369/291 X |
| 4,837,758 | 6/1989 | Motoyama et al. | 369/292 X |
| 4,858,050 | 8/1989 | Ashe et al. | 369/291 X |

FOREIGN PATENT DOCUMENTS

2082371 3/1982 United Kingdom .

Primary Examiner—John W. Shepperd
Assistant Examiner—Michael C. Kessell
Attorney, Agent, or Firm—Philip M. Shaw, Jr.

[57] ABSTRACT

A disc cartridge made up of a cartridge housing and a disc-shaped recording medium, such as an optical disc or a magneto-optical disc, accommodated in the cartridge housing, is disclosed. The cartridge housing of the disc cartridge is provided with a recording/reproducing aperture for exposing a part of the disc-shaped recording medium to the outside along the radius of the disc, and with a shutter member for opening or closing the aperture. Within a shutter opening actuating recess formed in the cartridge housing, a discriminating member associated with the type of the disc-shaped recording medium accommodated in the cartridge housing is provided for closing at least a part of the recess to prevent insertion of the disc cartridge into a recording and/or reproducing apparatus which is not suited to the type of the disc-shaped recording medium of the disc cartridge.

7 Claims, 11 Drawing Sheets

DISC CARTRIDGE AND RECORDING/REPRODUCING APPARATUS DISCRIMINATING MEANS

BACKGROUND OF THE INVENTION

1. Field of the Invention

This invention relates to a disc cartridge comprised of a disc-shaped recording medium, above all, an optical disc or a magneto-optical disc, as accommodated in a cartridge and, more particularly, to such a disc cartridge which is provided with a shutter for opening or closing a recording/reproducing aperture formed in the cartridge. The present invention also relates to a shutter opening/closing device for opening or closing the shutter of the disc cartridge.

2. Description of the Prior Art

Figure 1:
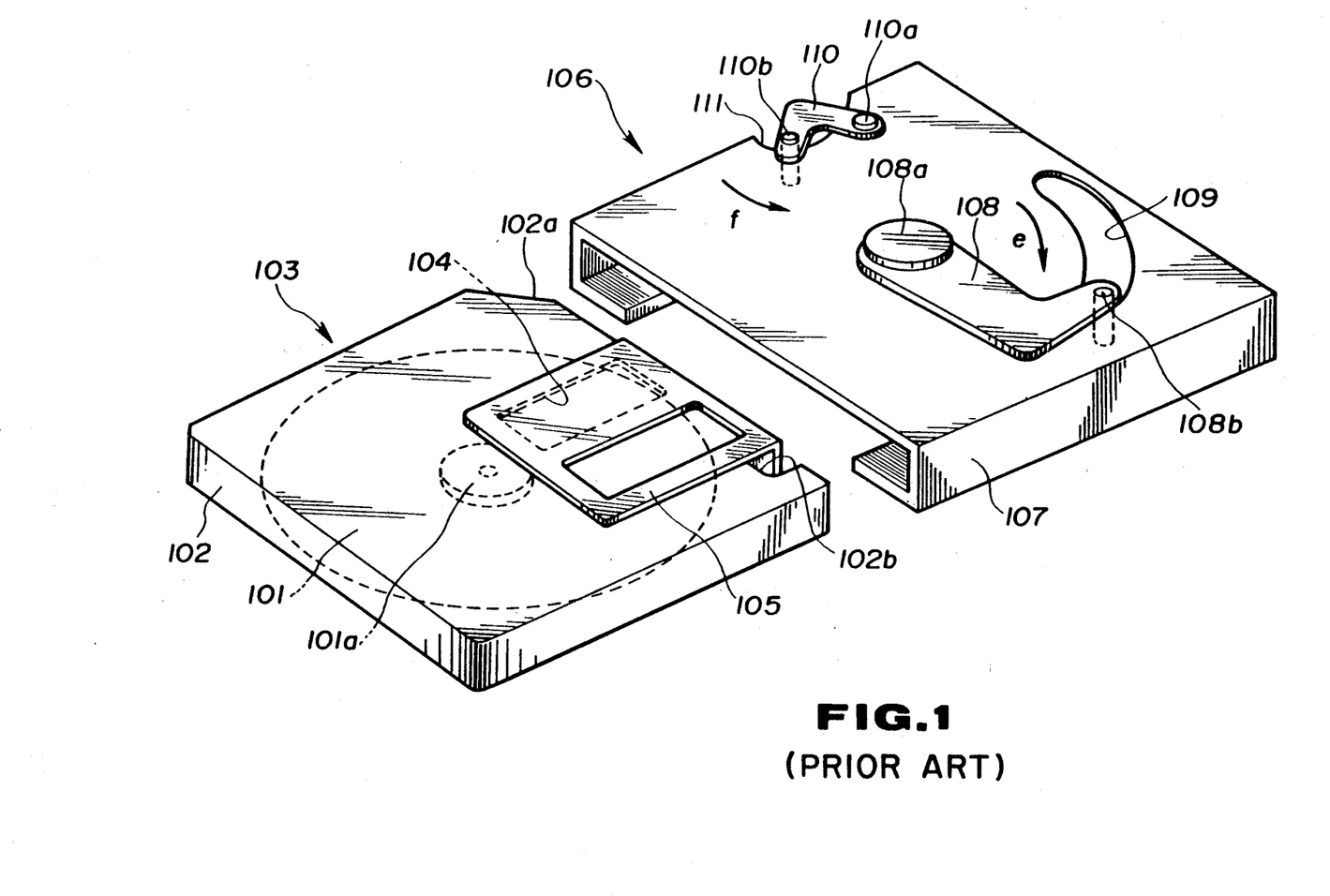
FIG. 1 is a perspective view showing the construction of a conventional disc cartridge and the manner in which the disc cartridge is inserted into a disc holder of a conventional recording and/or reproducing apparatus.
Figure 2:
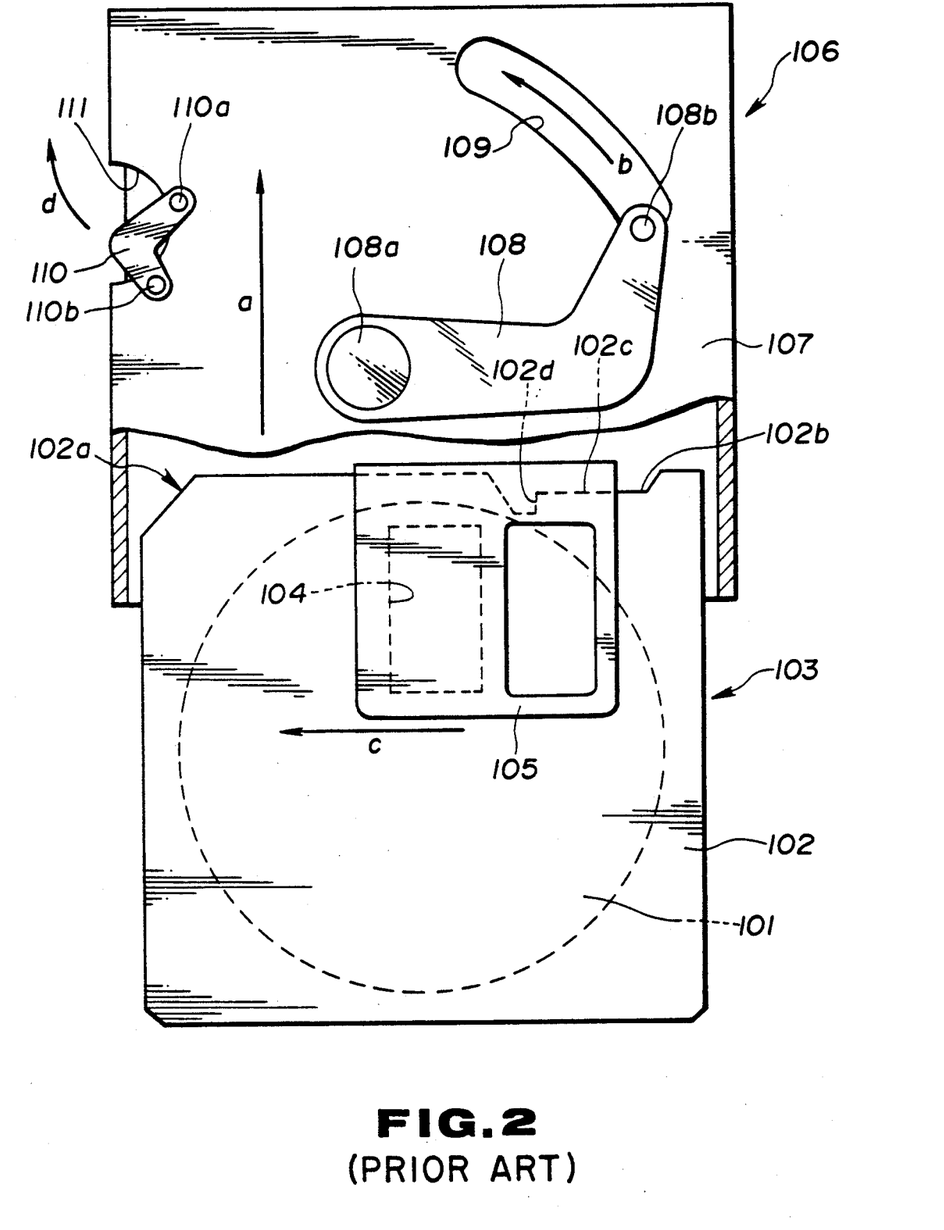
FIG. 2 is a plan view showing the state in which the conventional disc cartridge is being introduced into the disc holder of the conventional recording and/or reproducing apparatus, with a portion being broken away.

As shown in FIGS. 1 and 2, there has hitherto been proposed a disc cartridge 103 which is comprised of a disc 101, such as an optical disc or a magneto-optical disc, as a disc-shaped recording medium adapted for writing and/or reading information signals, and a cartridge housing 102 for rotatably accommodating the disc 101.

With such disc cartridge 103, the cartridge housing 102 is provided with a recording/reproducing aperture 104 by means of which the disc 101 may be partially exposed to the outside across its inner and outer peripheries. The disc cartridge 103 is also provided with a shutter member 105 movable with resect to the cartridge housing 102. The recording/reproducing aperture 104 is opened or closed when the shutter member 105 is moved with respect to the cartridge housing 102.

When the disc 101 is not in use, the recording/reproducing aperture 104 is closed by the shutter member 105 to prevent foreign matter or the user's hand or finger from being intruded into the inside of the cartridge housing 102.

When the disc 101 is to be in use, the cartridge housing 102 with the disc 101 accommodated therein is attached to a cartridge holder 106 of a recording/reproducing apparatus, not shown. The cartridge holder 106 includes a holder 107 which is substantially box-shaped to permit the cartridge housing 102 to be inserted therein and which is fitted with a shutter-opening lever 108 for opening the shutter member 105. The holder 107 is also fitted with a detection lever 110 for detecting the insertion of the cartridge housing 102 in an inappropriate direction.

The shutter-opening lever 108 has its proximal end fulcrumed at the middle of a major surface of the holder 107 by means of a pivot 108a. A shutter opening pin 108 is set upright on the distal end of the shutter-opening lever 108. This shutter-opening pin 108b depends into the interior of the holder 107 by way of a slit 109 formed in a major surface of the holder 107 along a locus of movement of the shutter-opening pin 108b which is centered about the pivot 108a. This shutter opening lever 108 is positioned at an initial position by being biased, by biasing means, not shown, in a direction of shifting the shutter opening pin 108b towards the forward side of the disc holder 107, as shown by an arrow in FIG. 10.

The detection lever 110 has its proximal end rotatably supported at a lateral side on the major surface of the holder 107 by means of a pivot 110a. A detection pin 110b is set on the distal end of the detection lever 110. The detection pin 110b depends into the inside of the holder 107 by way of a notch 111 formed on the lateral side of the holder 107. This detection lever 110 is positioned at an initial position by being biased, by biasing means, not shown, in a direction of shifting the detection pin 110b towards the inner side of the disc holder 107, as shown by an arrow f in FIG. 10.

When the disc cartridge 103 is introduced into the holder 107 of the cartridge holder 106, in a direction shown by an arrow a in FIG. 2, with the side of the shutter member 105 as the inserting end, the shutter opening pin 108b is inserted into a shutter opening recess 102b formed at one lateral side of the shutter member 105 of the cartridge 102. If the disc cartridge 103 is further introduced towards the interior of the holder 107, as shown by an arrow a in FIG. 2, the shutter-opening pin 108b is thrust by a shutter opening pin guide surface 102c extending continuously to the bottom surface of the shutter opening recess 102b. The shutter-opening pin 108b rotates the shutter-opening lever 108 in a direction shown by an arrow b in FIG. 2. The shutter member 105 is then thrust by the shutter-opening pin 108b and thereby shifted with respect to the cartridge housing 102 in a direction of opening the recording/reproducing aperture 104, as shown by an arrow C in FIG. 2.

One lateral side of the forward end of the cartridge housing 102, to which the shutter member 105 is attached, is formed with a chamfered edge 102a for the inappropriate inserting detection of the disc cartridge. This chamfered edge 102a is formed by obliquely removing the corner of the cartridge housing 102. When the disc cartridge 103 is introduced into the holder 107 in the normal direction, the detection pin 110b abuts on the chamfered edge 102a. This causes the detection lever 110 to be rotated outwardly of the holder 107, as shown by an arrow d in FIG. 2, to permit further intrusion of the cartridge housing 102 into the inside of the holder 107. Should it be tried to introduce the disc cartridge 103 into the holder 107 in the inappropriate direction, the detection lever 110 is not rotated, because the detection pin 110b abuts on the lateral side of the cartridge housing 102. Thus the detection lever 110 inhibits further intrusion of the cartridge housing 102 into the inside of the holder 107.

When the disc cartridge 103 is introduced further into the inside of the holder 107, the shutter-opening pin 108b is intruded into a recess 102d for shutter-opening pin 108b formed in continuation to the shutter opening pin guide 102c. Thus the position is reached in which the disc cartridge 103 is mounted in position within the holder 107. At this time, the recording/reproducing aperture 104 is opened, so that the disc 101 is exposed across its inner and outer peripheries towards the outside of the cartridge housing 102.

In the above described recording and/or reproducing apparatus, a pickup unit for writing and/or reading information signals, not shown, is adapted for facing the portion of the disc 101 which is exposed to outside by means of the recording and/or reproducing apparatus. A chucked section 101a, provided at the center of the disc 101, is held by a chuck unit, not shown, of the recording and/or reproducing apparatus.

In this state, the disc 101 is rotated by means of the chuck unit so that the information signals are written and/or read by means of the pickup device.

With the above described disc cartridge, a variety of discs having different structures and properties are used as the disc-shaped recording media. The properties of a disc-shaped recording medium include the volume of the information signals that may be recorded per unit area on the medium, that is the recording density, the quantity of the energy required for writing and/or reading the information signals, or the like.

Thus it is necessary to use such a recording and/or reproducing apparatus which, depending on the type of the disc-shaped recording medium, is capable of writing and/or reading the information signals in accordance with the properties and/or format of the disc-shaped recording medium. If the disc-shaped recording medium is inserted into a recording and/or reproducing apparatus which is not suited thereto, not only may the information signals not be recorded or reproduced, but also the disc-shaped recording medium may be destroyed.

Thus it has been customary with the disc cartridge that the cartridge of a different shape is used depending on the type of the disc-shaped recording medium to prevent the situation in which the cartridge housing accommodating a disc-shaped recording medium not suited to the recording and/or reproducing apparatus is inserted into the recording and/or reproducing apparatus. For example, it has been undertaken to use the cartridges of different thicknesses as a function of the types of the disc-shaped recording media accommodated therein, or to change the position and/or shape of the chamfered edge provided in the cartridge as a function of the disc-shaped recording media for preventing inappropriate insertion of the disc cartridge.

However, if it should be attempted to discriminate the types of the recording media by changing the cartridge shape, it is difficult to cope with a number of types of the disc-shaped recording media. That is, the cartridge has a moderate range of thickness, depending on the thickness of the recording medium, and can not be simply reduced or increased in thickness. Should the cartridge thickness not be appropriate for the thickness of the disc-shaped recording medium, it becomes difficult to write and/or read information signals on or from the disc/shaped recording medium, to achieve smooth rotation of the disc-shaped recording medium in the cartridge, to accommodate the disc in the cartridge housing, or to store the disc cartridge. Besides, there are only two places in which to provide the chamfered edge for detection of mistaken insertion, that is, one or the other edge on the forward side of the cartridge by which the cartridge may be inserted into the holder.

On the other hand, should the cartridge shape be changed to suit the types of the disc-shaped recording media, it becomes necessary to design the recording and/or reproducing apparatus with a different shape to suit to the different cartridge, thus complicating the design and/or manufacture of the recording and/or reproducing apparatus.

OBJECTS AND SUMMARY OF THE INVENTION

It is an object of the present invention to provide a disc cartridge in which, while different types of the disc-shaped recording media are accommodated in a cartridge housing of a standard common size, it is nevertheless possible to discern the type of the recording medium accommodated in the cartridge housing.

It is another object of the present invention to provide a disc cartridge in which it is possible to discern the type of the recording medium accommodated in the cartridge housing at the time of insertion of the disc cartridge into the recording and/or reproducing apparatus.

It is yet another object of the present invention to provide a disc cartridge in which it is possible to standardize the cartridge holder into which disc cartridges accommodating different types of the disc-shaped recording media are inserted.

In accordance with the present invention, there is provided a disc cartridge comprising a cartridge housing rotatably accommodating a disc-shaped recording medium and having a recording/reproducing aperture for exposing at least a part of said disc-shaped recording medium to the outside along the radius of the disc, a shutter member movably mounted on the cartridge housing for opening or closing the recording/reproducing aperture, and discriminating means for discriminating the type of the recording medium accommodated in the cartridge, said discriminating means being provided in a recess for shutter opening actuation, provided in the cartridge at a position corresponding to one lateral side of the shutter member, and including a means for closing at least a part of the recess.

With the above described disc cartridge of the present invention, the type of the disc-shaped recording medium accommodated in the cartridge housing may be discerned at the time of opening the shutter member, even though the cartridge housing accommodating variable types of the recording medium is of the same predetermined size.

Other objects and advantages of the present invention will become apparent from the following detailed description of certain illustrative embodiments of the present invention.

DETAILED DESCRIPTION OF PREFERRED EMBODIMENT

By referring to the drawings, illustrative embodiments of the present invention will be explained in detail.

Figure 3:
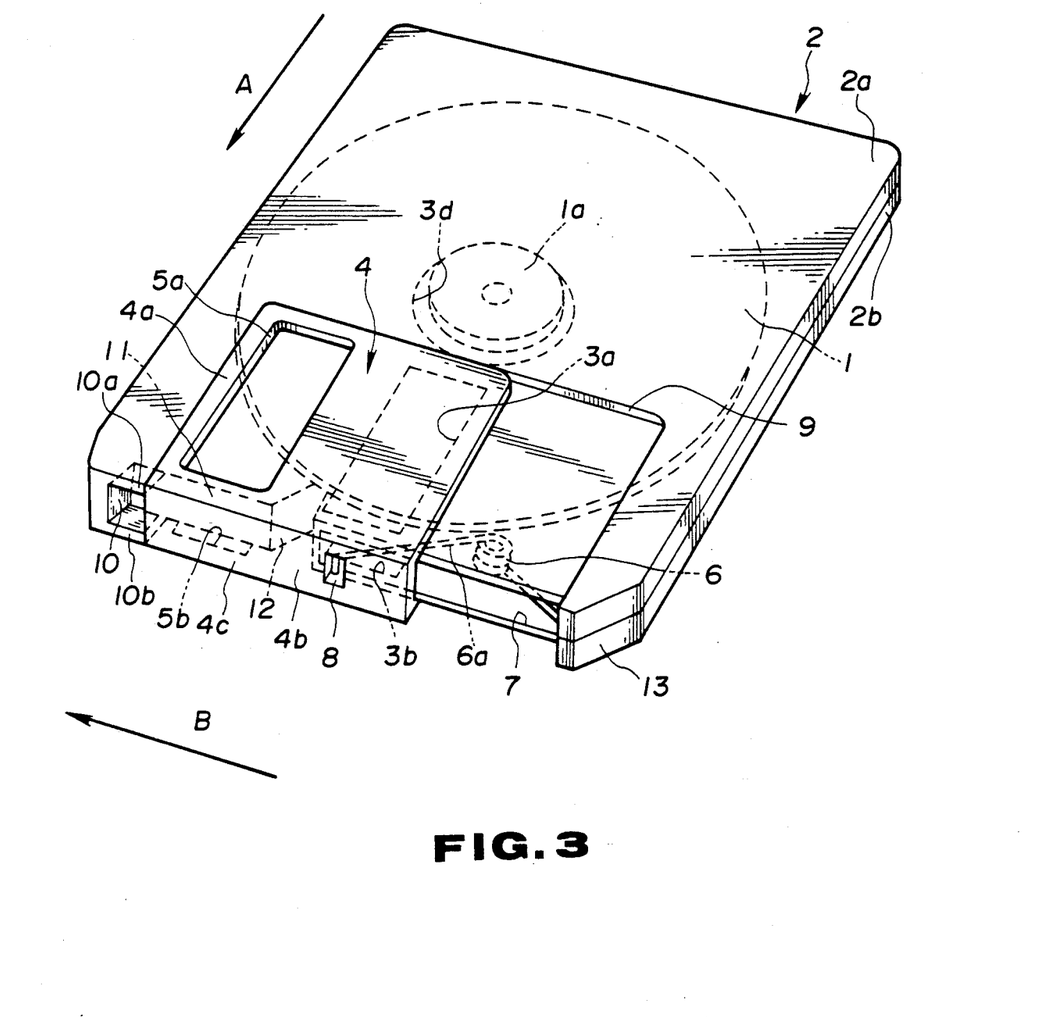
FIG. 3 is a perspective view showing the construction of a disc cartridge according to the present invention.

Referring to FIG. 3, a disc cartridge according to the present invention includes disc 1 as a disc-shaped recording medium for writing and/or reading information signals, and a cartridge housing 2 for rotatably accommodating the disc 1. The disc 1 may for example be an optical disc or a magneto-optical disc, the entire surface of which is formed as a signal recording surface. Information signals may be written on and/or read from the disc 1 with the aid of a recording and/or reproducing apparatus, not shown. A chucking hub 1a is provided at the center of the disc 1 in order for the disc 1 to be chucked by the recording and/or reproducing apparatus.

The cartridge housing 2 is formed as a substantially rectangular casing of a size corresponding to the disc size in order to accommodate the disc 1. This cartridge housing 2 is formed by an upper half 2a and a lower half 2b abutted and connected to each other. The upper half 2a, providing the upper major surface of the cartridge housing 2, is formed with an upper recording and/or reproducing aperture 3a for partially exposing the disc 1 to the outside across its inner and outer peripheries. The lower half 2b, providing the lower major surface of the cartridge housing 2, is formed with a lower recording and/or reproducing aperture 3b for partially exposing the disc 1 to the outside across its inner and outer peripheries. These recording and/or reproducing apertures 3a and 3b are formed on the forward side of the cartridge housing 2, that is, the side of the cartridge housing 2 by which the disc cartridge is first introduced into the recording and/or reproducing apparatus in the direction shown by an arrow A in FIG. 3.

A chucking aperture 3c for exposing the chucking hub 1a to the outside is formed at the center of the lower major surface of the cartridge housing 2.

A shutter member 4, movable with respect to the cartridge housing 2 and capable of opening and closing the recording and/or reproducing apertures 3a and 3b, is attached to the cartridge housing 2. The shutter member 4 is formed by a thin sheet of metal or synthetic resin which is bent substantially in a U shape so as to hold the forward side of the cartridge housing 2. The shutter member 4 is formed by an upper plate section 4a, directed to the upper major surface of the cartridge housing 2, a lower plate section 4b, directed to the lower major surface of the cartridge housing 2 and a forward plate section 4c interconnecting these upper and lower plate sections 4a and 4b.

This shutter member 4 is adapted to be moved with respect to the cartridge housing 2 from one lateral edge of the cartridge towards the other along the forward side of the cartridge housing 2 by which the forward plate section 4c is supported during movement of the shutter member. The shutter member 4 opens or closes the apertures 3a and 3b as it is moved with respect to the cartridge housing 2.

Thus the upper plate section 4a of the shutter member 4 is formed with an upper opening 5a of a size approximately equal to the size of the upper recording and/or reproducing aperture 3a. The upper opening 5a is formed at such a position that, when the shutter member 4 is near one of the above mentioned lateral edges of the cartridge housing 2, the upper opening 5a is in register with the upper recording and/or reproducing aperture 3a. The lower plate section 4b of the shutter member 4 is formed with a lower opening 5b of a size approximately equal to the size of the lower recording and/or reproducing aperture 3b and in register with the upper opening 5a. The lower opening 5b is in register with the lower recording and/or reproducing aperture 3b when the shutter member 4 is near the other lateral edge of the cartridge housing 2. Thus, when the shutter member 4 is near one or the other lateral edges of the cartridge housing 2, the shutter member 4 closes or opens the recording and/or reproducing apertures 3a and 3b, respectively.

The shutter member 4 is spring-biased towards one lateral edge of the cartridge housing 2, as shown by an arrow B in FIG. 3, by means of a torsion coil spring 6 provided in the cartridge housing 2 so as to be out of collision against the disc 1. The torsion coil spring 6 has the distal end of one of the arm sections 6b thereof exposed to the outside by means of a slit 7 formed in the front side of the cartridge housing 2, while having the distal end of the other arm section 6a engaged in an engaging member 8 provided in the forward plate section 4c. Thus, when the disc 1 is not in use, the recording and/or reproducing apertures 3a and 3b are closed by the shutter member 4 to protect the inside of the cartridge housing 2 against intrusion of foreign matter or the user's hand or finger.

It is noted that the upper and lower halves 2a and 2b are of reduced thicknesses along the path of movement of the shutter member 4 on the forward side of the cartridge housing 2 for forming a step 9 of a depth approximately equal to the thickness of the shutter member 4. Thus the outer lateral side of the shutter member 9 is substantially flush with the outer lateral surface of the cartridge housing 2.

The forward surface section of the cartridge housing 2 is formed with a shutter opening actuating recess 10 at a position facing one lateral edge of the forward plate section 4c of the shutter member 4 when the shutter member is near the above mentioned lateral edge of the cartridge housing 2 and thus at the position of closing the recording and/or reproducing apertures 3a and 3b. The lateral edge of the forward plate section 4c faces the inner side of the shutter opening actuating recess 10 when the shutter member 4 is at the position of closing the recording and/or reproducing apertures 3a and 3b. It is into this shutter opening actuating recess 10 that a shutter opening member of the recording and/or reproducing apparatus is engaged when the disc cartridge is mounted in position in the recording and/or reproducing apparatus.

Within the shutter opening actuating recess 10, an upper side discriminating member 10a is provided along the upper surface of the cartridge housing 2 for closing the upper side of the recess. Within the shutter opening actuating recess 10, a lower side discriminating member 10b is similarly provided along the lower surface of the cartridge housing 2 for closing the lower side of the recess. These discriminating members 10a and 10b are formed integrally with the upper and lower halves 2a and 2b, respectively. The forward ends of the discriminating members 10a and 10b are substantially flush with the forward plate section 4c of the shutter member 4.

Towards the above mentioned lateral edge of the forward surface of the cartridge housing 2, a shutter opening member guide surface 11 is formed in continuation to the bottom of the shutter opening actuating recess 10. The role of the shutter opening member guide surface 11 is to guide the shutter opening member of the recording and/or reproducing apparatus when the opening member is introduced into the recess 10 and shifted for opening the shutter member upon insertion of the disc cartridge in the recording and/or reproducing apparatus.

A shutter member receiving recess 12 is formed at the side of the shutter opening member guide surface 11, that is, at the side of the guide surface 11 opposite to the shutter opening actuating recess 10, or at the middle of the forward surface of the cartridge housing 2. When the shutter member 4 is near the above mentioned lateral edge of the cartridge housing 2, the shutter member receiving recess 12 is covered by the shutter member 4 and hence not exposed to the outside. When the opening operation of the shutter member 4 is terminated in the recording and/or reproducing apparatus, the shutter opening member receiving recess 12 is exposed to the outside and engaged by the shutter opening member. With the shutter opening member received in the recess 12, the cartridge housing 2 is at the predetermined insertion complete position within the recording and/or reproducing apparatus.

A chamfered section 13 for detecting the inappropriate insertion is provided at the above mentioned other lateral edge of the forward surface of the cartridge housing 2. The chamfered section 13 is formed by obliquely cutting the corner of the cartridge housing 2.

Figure 4:
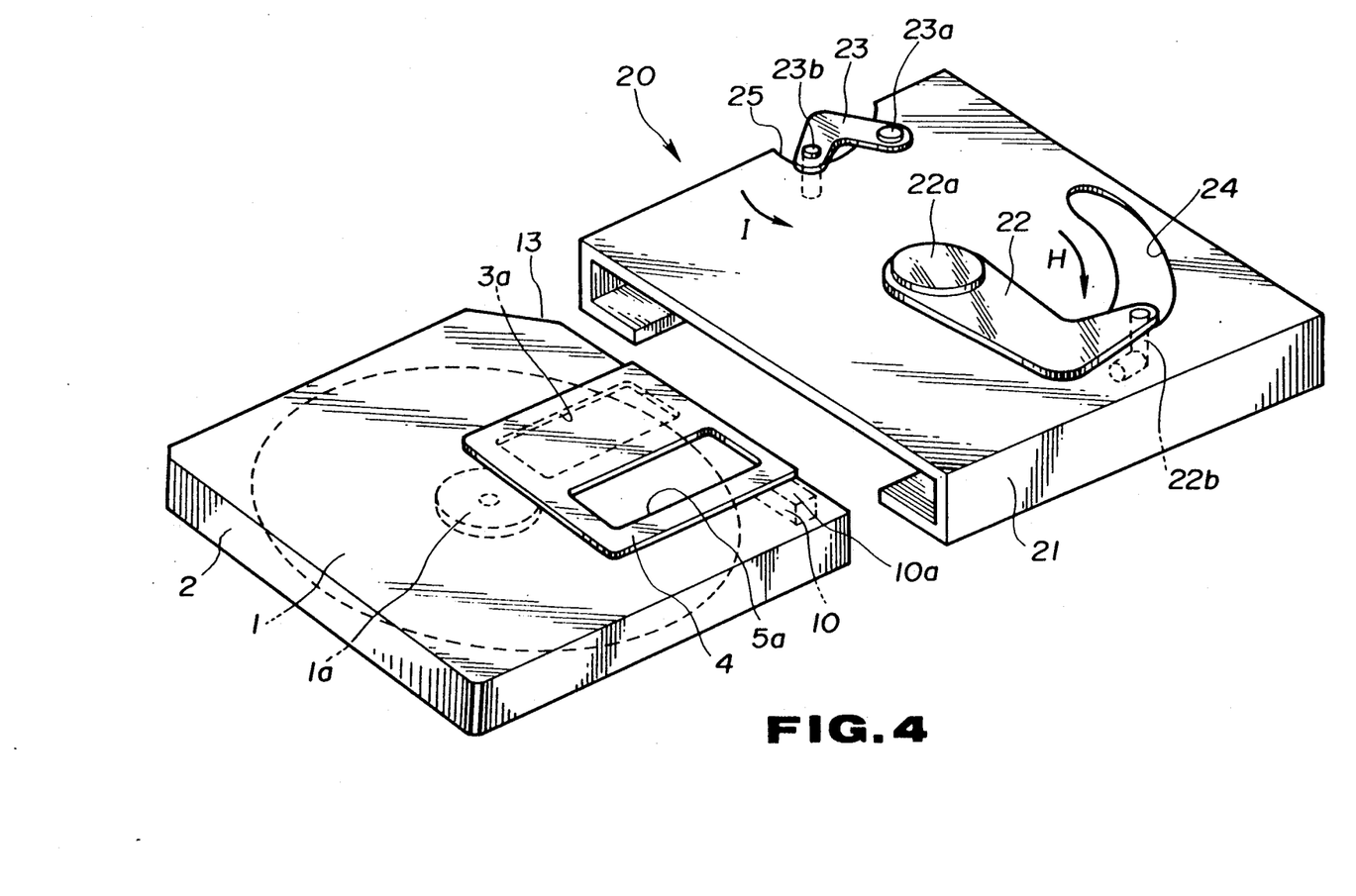
FIG. 4 is a perspective view showing the state in which the disc cartridge is about to be inserted into a disc holder of a recording and/or reproducing apparatus, with a portion being broken away.

When inserting the above described disc cartridge according to the present invention in position in the recording and/or reproducing apparatus adapted for recording and/or reproducing information signals on or from the disc 1, the disc cartridge is inserted into the disc holder 20 of the recording and/or reproducing apparatus, as shown in FIG. 4. At this time, the disc cartridge is inserted so that the forward side thereof mounting the shutter member 4 serves as the inserting end into the disc holder 20.

The recording and/or reproducing apparatus for recording and/or reproducing information signals on or from the disc 1 of the disc cartridge is similar in construction to the conventional recording and/or reproducing apparatus employing the conventional disc cartridge shown in FIG. 2.

Thus the cartridge holder 20 has a holder channel 21 which is substantially box-shaped to permit the cartridge housing 2 to be inserted therein and to which a shutter opening lever 22 is pivotally mounted for shifting the shutter member to its opened position. A mistaken insertion detection lever 23 for detecting the insertion of the cartridge housing 2 in an inappropriate direction is rotatably mounted on the holder channel 21.

The shutter opening lever 22 has its proximal end rotatably supported at the mid position on one major surface of the holder channel 21 by means of a pivot 22a. A shutter opening pin 22b functioning as the shutter opening member is set on the distal end of the shutter opening lever 22.

Figure 5:
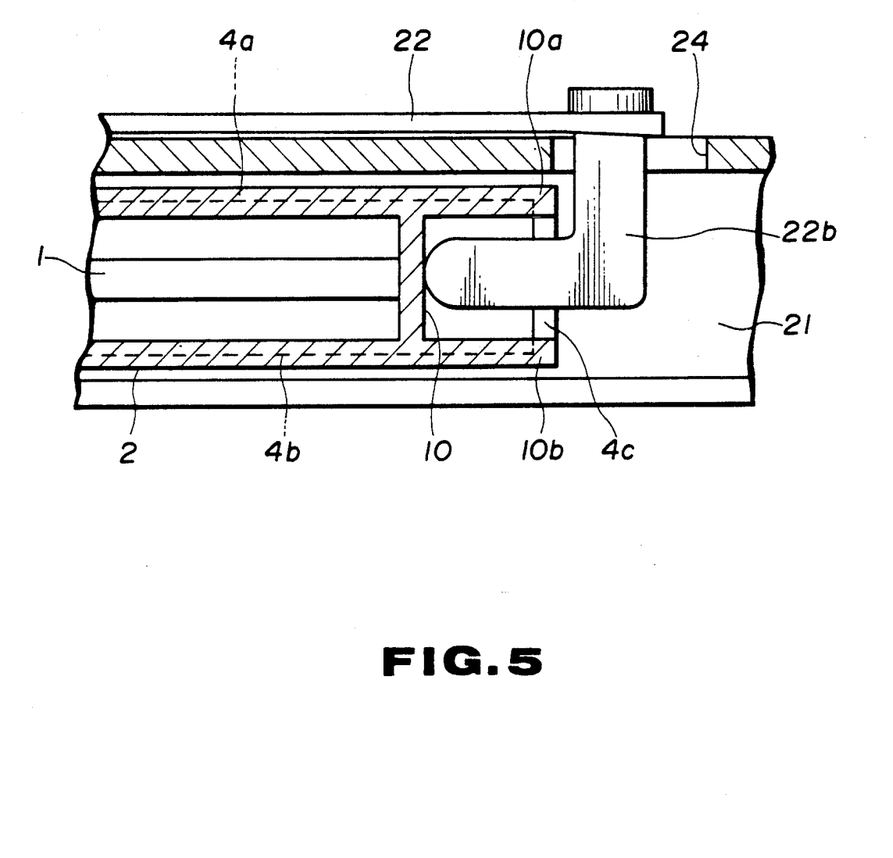
FIG. 5 is an enlarged partial side elevation showing a shutter opening pin provided in the disc holder.

The shutter opening pin 22b depends into the inside of the holder channel 21 by way of a slit 24 formed in one major surface of the holder channel 21 for extending along a path of movement of the shutter opening pin 22b centered about the pivot 22a. As shown in FIG. 5, the shutter opening pin 22b is bent at the distal end for facing the shutter opening actuating recess 10 of the disc cartridge which is introduced into the recording and/or reproducing apparatus.

The shutter opening lever 22 is positioned in the initial state at which it is biased by biasing means, not shown, in a direction in which the shutter opening pin 22b is shifted towards the forward side of the disc holder 21, as shown by an arrow H in FIG. 4.

The detection lever 23 has its proximal end rotatably supported towards one lateral edge on the major surface of the holder channel 21 by a pivot 23a. A detection pin 23b is set on the distal end of the detection lever 23. The detection pin 23b is directed to the inside of the holder channel 21 by way of a notch 25 formed on the above mentioned lateral edge of the holder channel 21. This detection lever 23 is positioned in the initial state in which it is biased by biasing means, not shown, in a direction of shifting the detection pin 23b towards the inside of the disc holder channel 21, as shown by an arrow I in FIG. 4.

Figure 6:
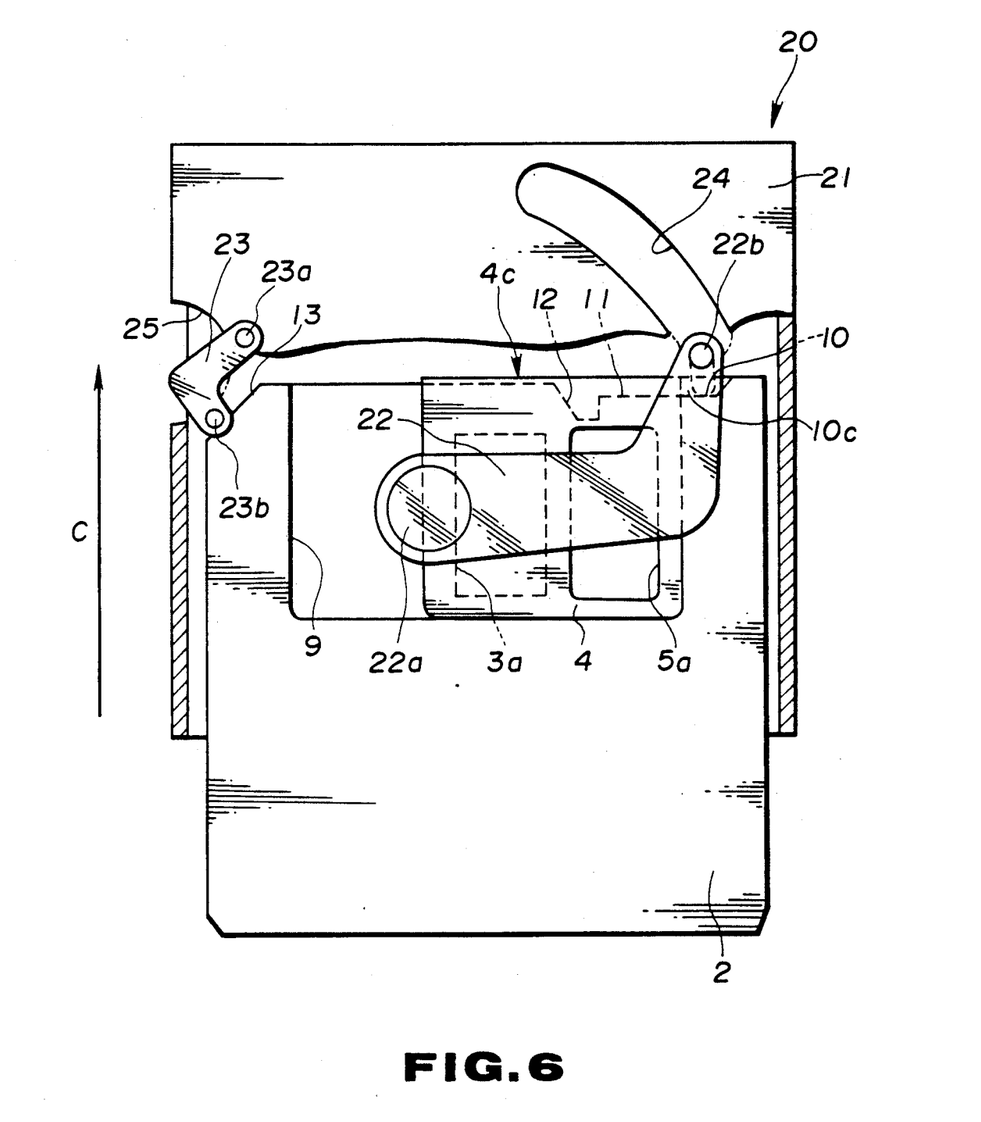
FIG. 6 is a plan view showing the state in which the disc cartridge has started to be introduced into to the disc holder, with a portion being broken away.

When the disc cartridge is introduced into the holder channel 21 of the holder 20, with the forward side thereof as the inserting side, in a direction shown by an arrow C in FIG. 6, the distal end of the shutter opening pin 22b is introduced into the inside of the shutter opening recess 10 of the cartridge housing 2 without impinging on the discriminating members 10a or 10b.

Figure 7:
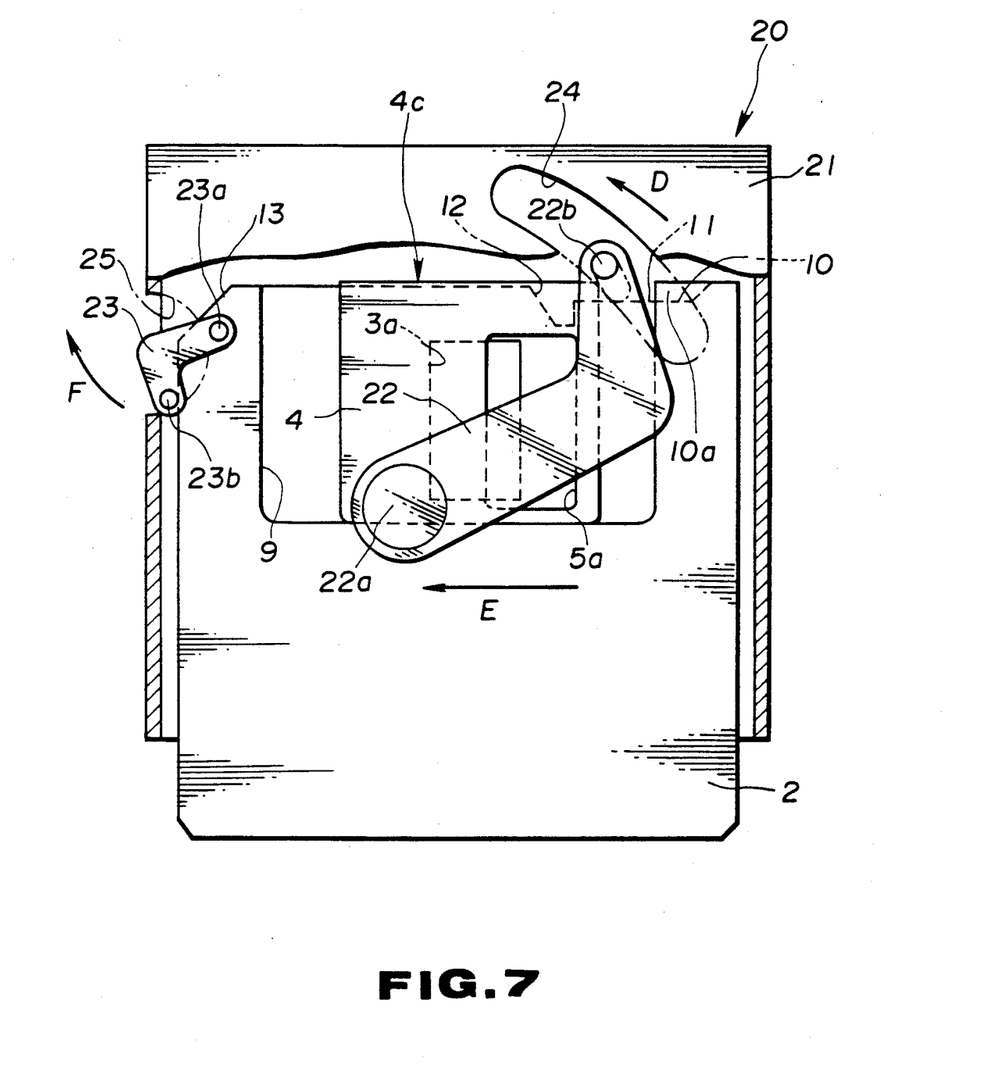
FIG. 7 is a plan view showing the state in which the disc cartridge is being introduced into the disc holder, with a portion being broken away.

When the disc cartridge is further introduced under this state into the holder channel 21, as shown by the arrow C in FIG. 6, the shutter opening pin 22b is thrust by the shutter opening member guide surface 11 of the cartridge housing 2, as shown in FIG. 7, so that the shutter opening lever 22 is rotated in a direction shown by an arrow D in FIG. 7. The shutter member 4 is then thrust by the shutter opening pin 22b and thereby moved with respect to the cartridge proper 2 in a direction of opening the recording and/or reproducing apertures 3a and 3b, as shown by an arrow E in FIG. 7.

It is noted that, when the disc cartridge is introduced into the holder channel 21 in the appropriate direction, the detection pin 23b abuts on the inappropriate insertion detecting chamfered section 13. The detection lever 23 is rotated towards the outside of the holder channel 21, as shown by an arrow in FIG. 7, to permit the cartridge housing 2 to be introduced further into the inside of the holder channel 21. On the contrary, when the disc cartridge is inserted in the inappropriate direction into the holder channel 21, the detection lever 23 is not rotated, because the detection pin 23b abuts on the forward surface of the cartridge housing 2. Thus the detection lever inhibits further intrusion of the cartridge housing 2 into the inside of the holder channel 21.

Figure 8:
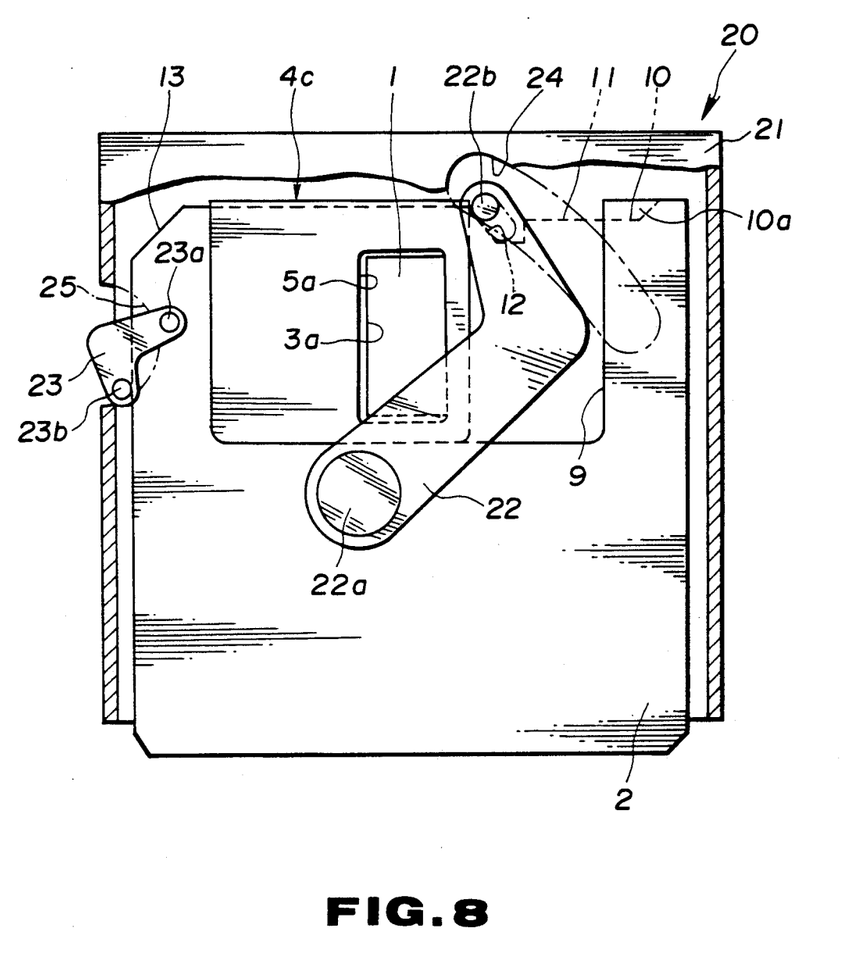
FIG. 8 is a plan view showing the state in which the disc cartridge has been fully inserted into the disc holder, with a portion being broken away.

When the disc cartridge is fully introduced into the inside of the holder channel 21, the shutter opening pin 22b is intruded into the shutter opening member receiving recess 12, as shown in FIG. 8, so that the cartridge housing 2 is mounted in position within the holder channel 21. At this time, the recording and/or reproducing apertures 3a and 3b are opened for exposing the disc 1 towards the outside of the cartridge housing 2 across its inner and outer peripheries.

With the above described recording and/or reproducing apparatus, a read/write pickup unit, not shown, faces that area of the disc 1 exposed to the outside by means of the apertures 3a and 3b. The chucking hub 1a at the middle of the disc 1 is chucked by a chuck unit, not shown, of the recording and/or reproducing apparatus, by means of the chucking opening 3c.

The disc 1 is rotated in this state by means of the chucking unit to permit the write/read operation to be performed by means of the pickup unit.

Figure 9:
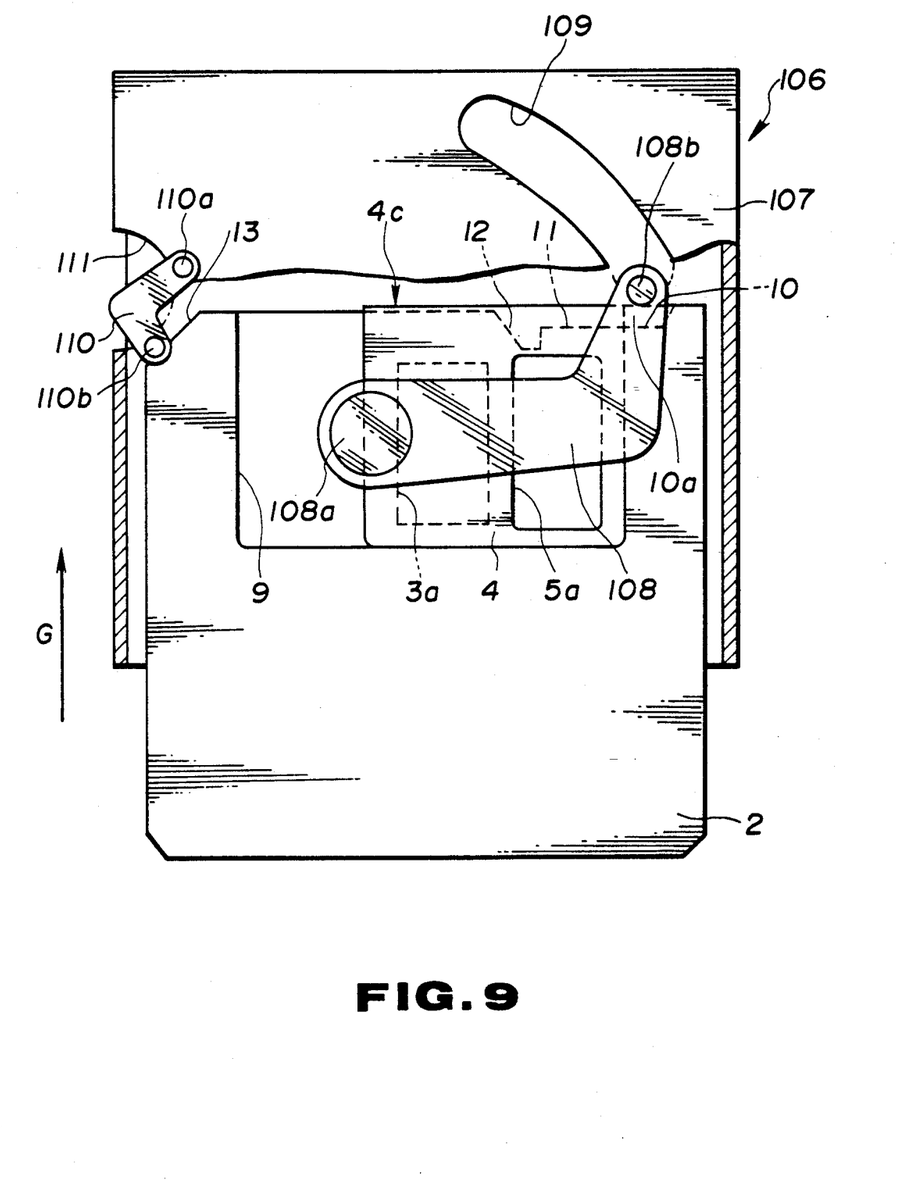
FIG. 9 is a plan view showing the state in which the disc cartridge of FIGS. 3 to 8 has started to be introduced the disc holder of the conventional recording and/or reproducing apparatus, with a portion being broken away.
Figure 10:
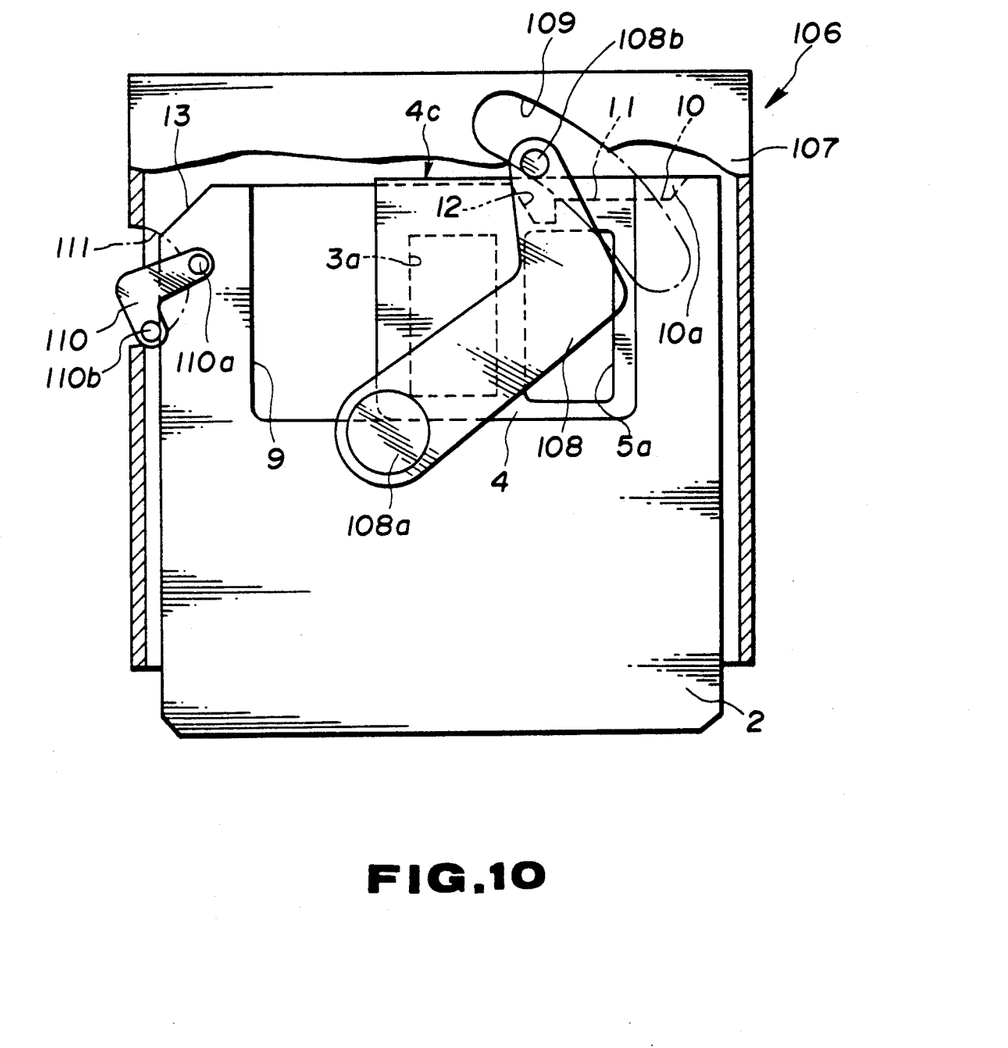
FIG. 10 is a plan view showing the state in which the disc cartridge of FIGS. 3 to 8 is being introduced into the disc holder of the conventional recording and/or reproducing apparatus, with a portion being broken away.

When the disc cartridge is inserted, as shown in FIG. 9, into the disc holder 106 of the conventional recording and/or reproducing apparatus, shown in FIG. 2, the shutter opening pin 108 abuts on the format ends of the discriminating members 10a and 10b, but is not intruded into the shutter opening actuating recess 10, because it is a substantially linear in shape. When the disc cartridge is further introduced into the inside of the disc holder 106, as shown by an arrow G in FIG. 9, the shutter opening lever 108 is rotated. The shutter opening pin 108b is moved by sliding on the forward plate section 4c of the shutter member 4, from the forward ends of the discriminating members 10a and 10b, as shown in FIG. 10.

If the disc cartridge is further moved in this state into the inside of the disc holder 106, the shutter member 4 is not moved with respect to the cartridge housing 2. Thus the shutter opening pin 108b is not introduced into the shutter opening member receiving recess 12. Thus the disc cartridge is not fully loaded into the conventional recording and/or reproducing apparatus, because the cartridge housing 2 is not at the predetermined loading complete position with respect to the disc holder 106.

That is, by having the above mentioned discriminating members 10a and 10b, the disc cartridge according to the present invention may be discriminated as being loadable into a recording and/or reproducing apparatus adapted for recording and/or reproducing information signals on or from the above described disc 1 and as being unloadable into the conventional recording and/or reproducing apparatus.

It is noted that the conventional disc cartridge 103 shown in FIG. 1 may be loaded into the recording and/or reproducing apparatus for recording and/or reproducing information signals on or from the disc 1 of the disc cartridge according to the present invention, in the same may as it is loaded into the conventional recording and/or reproducing apparatus.

The disc cartridge according to the present invention is not limited to the above described embodiment. For example, the number as well as the shape of the discriminating members may be selected suitably as a function of the type of the shutter opening member(s) provided in the recording and/or reproducing apparatus.

Figure 11:
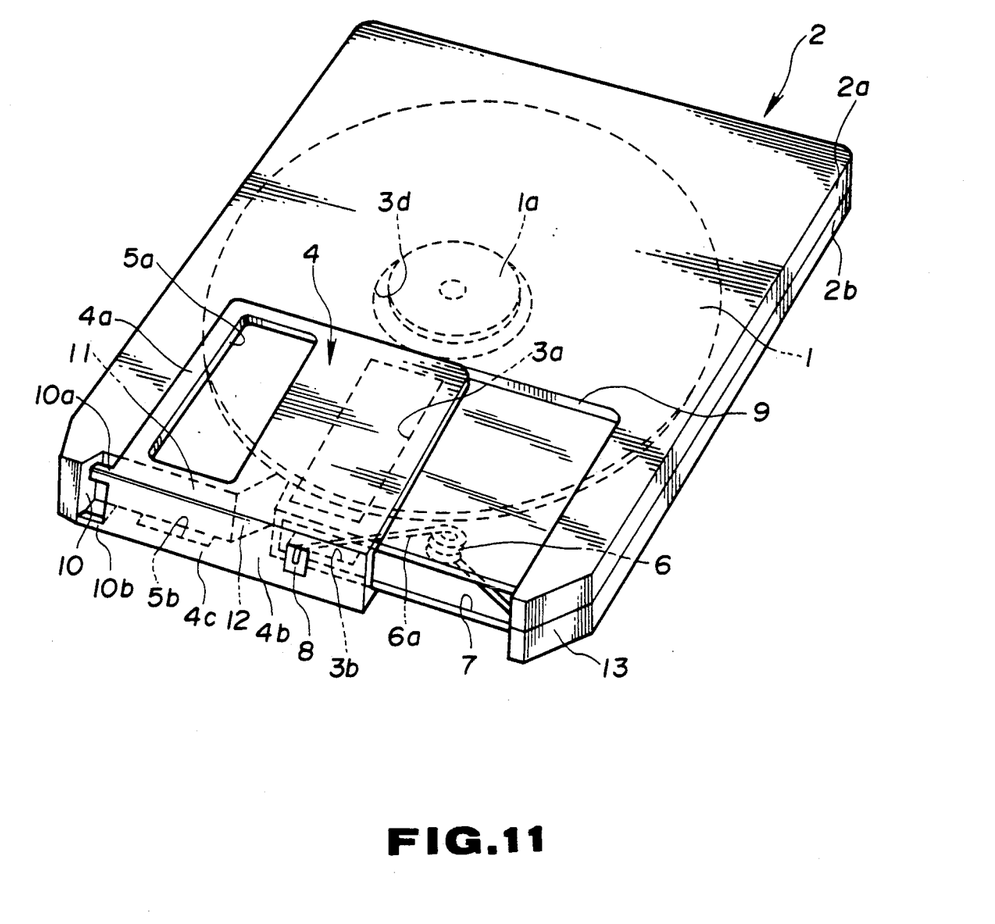
FIG. 11 is a perspective view showing a modification of the disc cartridge shown in FIGS. 3 to 8.

The discriminating members may be provided integrally with the shutter member 4, as shown in FIG. 11. In the present embodiment, the discriminating members 10a and 10b are formed as lugs extending from the lateral side of the forward plate 4c of the shutter member 4 and partially closing the shutter opening actuating recess 10 when the shutter member 4 is near the above described lateral edge of the cartridge housing 2. The disc cartridge having such discriminating members 10a and 10b may also be discerned as being loadable into the recording and/or reproducing apparatus for recording and/or reproducing information signals on or from the disc 1 and being unloadable into the conventional recording and/or reproducing apparatus.

In addition, three or more different disc types may be discerned by suitably setting the position of the discriminating members within the shutter opening actuating recess.

With the disc cartridge according to the present invention, as described hereinabove, the discriminating member or members associated with the type of the disc-shaped recording medium are provided within a shutter opening actuating recess at a lateral edge of the shutter member of the cartridge accommodating the disc-shaped recording medium, for closing at least a part of the recess. Therefore, the type of the disc-shaped recording medium may be discriminated at the time of opening the shutter member, even though the cartridges accommodating variable types of the disc-shaped recording medium are of the same shape.

Besides, in the recording and/or reproducing apparatus for recording and/or reproducing information signals with the use of the disc cartridge of the present invention, the cartridge holder accommodating the disc cartridge may be of a common shape in which case the types of the disc-shaped recording media may still be discerned by the different shapes of the shutter opening member employed in the recording and/or reproducing apparatus.

What is claimed is:

1. A disc cartridge comprising a cartridge housing rotatably accommodating a disc-shaped recording medium therein, said cartridge housing having a forward side and having a recording/reproducing aperture for exposing at least a part of said disc-shaped recording medium to the outside along the radius of the disc,
   a shutter member movably attached to said cartridge for opening or closing said aperture, and
   discriminating means for discriminating the type of the recording medium accommodated in said cartridge, said discriminating means being provided in a recess for shutter opening actuation in said cartridge and including means for closing at least a part of said recess whereby said recess can only be entered from the forward side.

2. The disc cartridge according to claim 1 wherein said recess for shutter opening actuation is provided on the forward side of said cartridge in the inserting direction into a recording and/or reproducing apparatus and wherein said discriminating means is provided on the upstream side of said recess when said aperture in said shutter member is moved from a closure position to an opening position and on the upstream side of the closure position of said aperture.

3. The disc cartridge according to claim 1 wherein said discriminating means is provided in said cartridge.

4. A disc cartridge comprising a cartridge housing rotatably accommodating a disc-shaped recording medium therein, said cartridge housing having a forward side and having a recording/reproducing aperture for exposing at least a part of said disc-shaped recording medium to the outside along the radius of the disc,
   a shutter member movably attached to said cartridge for opening or closing said aperture, and
   discriminating means for discriminating the type of the recording medium accommodated in said cartridge, said discriminating means being provided in a recess for shutter opening actuation in said cartridge and including means for closing at least a part of said recess, wherein said discriminating means is provided in said shutter member, and whereby said recess can only be entered from the forward side.

5. A disc cartridge comprising a cartridge housing rotatably accommodating a disc-shaped recording medium therein said cartridge housing having a forward side and having a recording/reproducing aperture for exposing at least a part of said disc-shaped recording medium to the outside along the radius of the disc, a shutter member movably attached to said cartridge for opening or closing said aperture, and discriminating means for discriminating the type of the recording medium accommodated in said cartridge, said discriminating means being provided in a recess for shutter opening actuation in said cartridge and including means for closing at least a part of said recess, whereby said recess can only be entered from the forward side, and, wherein said discriminating means closes at least a part of said recess and it is provided with at least one projection to permit insertion of an opening member for opening said shutter member.

6. A device for opening a shutter movably mounted on a disc cartridge including a cartridge housing rotatably accommodating a disc-shaped recording medium, said housing having a partially covered discrimination recess for shutter opening actuation formed therein, said shutter being adapted for opening or closing an aperture formed in said cartridge housing, said device comprising an arm member rotated by said disc cartridge moved in an inserting direction, and shutter opening means provided on the free rotating end of said arm member and introduced into said partially covered discrimination recess formed in said disc cartridge housing for shutter opening actuation, said shutter opening means being inserted in the direction of the major surface of said disc cartridge recess and adapted for moving said shutter in the direction of opening said aperture as a result of rotation of said arm member(s).

7. The device according to claim 6 wherein said shutter opening means comprises a first part extending in a depending direction from one surface of said arm member and a second part extending from the distal end of said first part so as to be introduced into said recess for shutter opening actuation in said disc cartridge.

* * * * *